US012626828B1

(12) United States Patent
Baylor et al.

(10) Patent No.: US 12,626,828 B1
(45) Date of Patent: May 12, 2026

(54) TRITIUM-COMPATIBLE CRYOGENIC PELLET GAS GUN

(71) Applicant: UT-Battelle, LLC, Oak Ridge, TN (US)

(72) Inventors: Larry R. Baylor, Oak Ridge, TN (US); Steven J. Meitner, Oak Ridge, TN (US); William D. McGinnis, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 19/345,069

(22) Filed: Sep. 30, 2025

(51) Int. Cl.
*G21B 1/15* (2006.01)

(52) U.S. Cl.
CPC .................................... *G21B 1/15* (2013.01)

(58) Field of Classification Search
CPC ........................................................ G21B 1/15
See application file for complete search history.

(56) References Cited

U.S. PATENT DOCUMENTS 3,378,446 A * 4/1968 Whittlesey ............... G21B 1/23 376/101
3,624,239 A * 11/1971 Fraas ....................... G21B 1/03 976/DIG. 3
3,723,246 A * 3/1973 Lubin ....................... G21B 1/19 376/101
3,762,992 A * 10/1973 Hedstrom ................ G21B 1/03 976/DIG. 3
3,967,215 A * 6/1976 Bellak ...................... G21B 1/03 976/DIG. 3

(Continued)

FOREIGN PATENT DOCUMENTS

CN 104637550 A * 5/2015 ............... G21B 1/25
CN 115240877 A * 10/2022 ............... G21B 1/25

(Continued)

OTHER PUBLICATIONS

Combs, Stephen Kirk, and Larry R. Baylor. "Pellet-injector technology—brief history and key developments in the last 25 years." Fusion Science and Technology 73.4 (2018): 493-518. (Year: 2018).*

(Continued)

*Primary Examiner* — Lily C Garner
(74) *Attorney, Agent, or Firm* — WARNER NORCROSS + JUDD LLP

(57) ABSTRACT

A tritium-compatible pellet gas gun for a deuterium-tritium (D-T) pellet fueling apparatus is provided. In one aspect, the tritium-compatible pellet gas gun includes a pellet sizer assembly that provides in situ adjustment of pellet length during injector operation. The pellet sizer assembly includes a guillotine slide that is actuated by a pusher tube, the guillotine slide being operable to restrict the orifice of the extruder nozzle to reduce pellet length with fine resolution. The tritium-compatible pellet gas gun also includes dual flexible metal bellows seals that maintain hermetic separation between the D-T fuel region, a guard vacuum, and the ambient environment, while still permitting linear motion. This configuration allows the pellet length to be reduced by up to 50% without venting or warming the D-T pellet fueling apparatus.

17 Claims, 9 Drawing Sheets

(56) References Cited

U.S. PATENT DOCUMENTS

| | | | | | |
|---|---|---|---|---|---|
| 4,136,926 | A * | 1/1979 | Sigler | G02B 19/0047 | 376/104 |
| 4,142,088 | A * | 2/1979 | Hirsch | G21B 1/15 | 376/104 |
| 4,158,598 | A * | 6/1979 | Baird | G21B 1/03 | 976/DIG. 3 |
| 4,179,192 | A * | 12/1979 | Shafer | G21B 1/23 | 376/104 |
| 4,290,848 | A * | 9/1981 | Sudan | G21B 1/03 | 976/DIG. 3 |
| 4,304,627 | A * | 12/1981 | Lewis | G21B 1/23 | 976/DIG. 3 |
| 4,440,714 | A * | 4/1984 | Rose | G21B 1/03 | 976/DIG. 3 |
| 4,569,819 | A * | 2/1986 | David | G21J 3/00 | 976/DIG. 3 |
| 4,657,721 | A * | 4/1987 | Thomas | G21B 1/23 | 376/104 |
| 4,904,441 | A * | 2/1990 | Sorensen | G21B 1/19 | 264/28 |
| 5,406,594 | A * | 4/1995 | Frattolillo | H05H 1/22 | 376/101 |
| 6,807,216 | B1 * | 10/2004 | Hilliard | H01S 3/08045 | 372/39 |
| 9,171,646 | B2 * | 10/2015 | Moses | G21C 3/626 | |
| 10,660,192 | B2 * | 5/2020 | Campbell | H05H 1/22 | |
| 2004/0141578 | A1 * | 7/2004 | Enfinger | G21B 1/03 | 376/100 |
| 2005/0163184 | A1 * | 7/2005 | Hilliard | H01S 3/08004 | 372/66 |
| 2007/0237278 | A1 * | 10/2007 | Lamont | G21B 1/03 | 376/100 |
| 2008/0063132 | A1 * | 3/2008 | Birnbach | G21B 1/03 | 376/107 |
| 2009/0000268 | A1 * | 1/2009 | Yurash | H05H 6/00 | 60/202 |
| 2011/0261919 | A1 * | 10/2011 | Sefcik | G21B 1/23 | 376/152 |
| 2013/0064340 | A1 * | 3/2013 | Latkowski | G21B 1/19 | 376/146 |
| 2014/0233687 | A1 * | 8/2014 | Jack | G21B 3/006 | 376/101 |
| 2014/0286471 | A1 * | 9/2014 | Moses | G21B 1/13 | 376/103 |
| 2015/0270019 | A1 * | 9/2015 | Sekine | G21B 1/15 | 376/103 |
| 2019/0198182 | A1 * | 6/2019 | Parks | G21B 1/057 | |
| 2024/0158106 | A1 * | 5/2024 | Nakamura | B64G 1/422 | |
| 2024/0213736 | A1 * | 6/2024 | Nakamura | G21B 1/23 | |
| 2024/0221963 | A1 * | 7/2024 | Nakamura | G21B 1/15 | |
| 2024/0387062 | A1 * | 11/2024 | Nakamura | G21B 1/19 | |
| 2025/0055249 | A1 * | 2/2025 | Nakamura | H01S 5/0071 | |

FOREIGN PATENT DOCUMENTS

| | | | | |
|---|---|---|---|---|
| JP | H0552978 | A * | 3/1993 | |
| JP | 2941370 | B2 * | 8/1999 | G21B 1/15 |
| RU | 2229749 | C2 * | 5/2004 | |

OTHER PUBLICATIONS

Combs, Stephen Kirk, et al. "Alternative techniques for injecting massive quantities of gas for plasma-disruption mitigation." IEEE transactions on plasma science 38.3 (2010): 400-405. (Year: 2010).*

Geraud, Al, et al. "Status of the JET high frequency pellet injector." Fusion Engineering and Design 88.6-8 (2013): 1064-1068. (Year: 2013).*

Combs, Stephen Kirk, et al. "A technique for producing large dual-layer pellets in support of disruption mitigation experiments." Fusion Science and Technology 60.2 (2011): 473-479. (Year: 2011).*

Lyttle, M. S., et al. "Tritium challenges and plans for ITER pellet fueling and disruption mitigation systems." Fusion Science and Technology 71.3 (2017): 251-255. (Year: 2017).*

Meitner, S. J., and L. R. Baylor. "Initial commissioning test results of the wendelstein 7-x continuous pellet fueling system." Fusion Science and Technology 79.8 (2023): 1065-1070. (Year: 2023).*

Meitner, S. J., et al. "Cryogenic pellet production developments for long-pulse plasma operation." AIP Conference Proceedings. vol. 1573. No. 1. American Institute of Physics, 2014. (Year: 2014).*

Meitner, Steven, et al. "Design and commissioning of a three-barrel shattered pellet injector for DIII-D disruption mitigation studies." Fusion Science and Technology 72.3 (2017): 318-323. (Year: 2017).*

Meitner, S. J., L. R. Baylor, and W. D. McGinnis. "R&D extruder developments for the wendelstein 7-X continuous pellet fueling system." IEEE Transactions on Plasma Science 50.6 (2022): 1957-1961. (Year: 2022).*

Zoletnik, Sándor, et al. "Production and launch studies of cryogenic pellets for the ITER disruption mitigation system." Nuclear Fusion 64.9 (2024): 096033. (Year: 2024).*

Wright, K. E., et al. "Conceptual design of the neutral beamline for TPX long pulse operation." 15th IEEE/NPSS Symposium. Fusion Engineering. vol. 1. IEEE, 1993. (Year: 1993).*

Meitner, Steven J., et al. "Design of a continuous pellet fueling system for Wendelstein 7-X." IEEE Transactions on Plasma Science 48.6 (2019): 1585-1590. (Year: 2019).*

Milora, S. L., et al. Design of a repeating pneumatic pellet injector for the joint European torus. No. CONF-871007-16. Oak Ridge National Lab., TN (USA), 1986. (Year: 1986).*

Baylor et al., "Pellet fueling and control of burning plasmas in ITER", Nucl. Fusion 47, 443-448 (2007).

Baylor et al., "Polarized fusion and potential in situ tests of fuel polarization survival in a tokamak plasma", Nucl. Fusion 63, 076009 (30pp) (2023).

Baylor et al., "Issues in Formation of Cryogenic Pellets for Fusion Applications", Fusion Science and Technology, vol. 77, 728-737 (2021).

Baylor et al., "Tritium Aspects of Fueling and Exhaust Pumping in Magnetic Fusion Energy", Fusion Science and Technology, vol. 71, 256-260 (2017).

* cited by examiner

TRITIUM-COMPATIBLE CRYOGENIC PELLET GAS GUN

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to cryogenic fueling systems for deuterium-tritium fusion reactors and other applications.

BACKGROUND OF THE INVENTION

Deuterium-tritium (D-T) fusion reactors require the continuous injection of solid cryogenic fuel pellets into a plasma. This operation generally requires accelerating pellets that are cut from a continuous extrusion composed of frozen hydrogen isotopes. Gas gun pellet injectors were developed specifically for deuterium-deuterium (D-D) fusion experiments, however several shortcomings remain for use with D-T fusion reactors.

The original gas gun pellet injector developed at Oak Ridge National Laboratory used a moving barrel to cut and chamber pellets. However, this configuration allowed misalignment between the barrel and a downstream injection line guide tube. A later gas gun pellet injector design improved reliability by using a solenoid-driven cutting tube and a fixed barrel. In operation, the cutting tube punches out and chambers a pellet into the barrel, after which a fast-opening solenoid valve releases high-pressure propellant gas (helium, hydrogen, deuterium, or tritium) to accelerate the pellet to speeds up to 1 km/s, with demonstrated injection frequencies above 5 Hz.

Despite these advances, existing gas gun pellet injectors suffer from several shortcomings for use with a D-T fusion reactor. The pellet size is fixed by the cutter diameter and extrusion nozzle dimensions, requiring system warm-up and component replacement for adjustment. Long-term tritium compatibility is also limited by: solenoid coil insulation, neoprene bump stops, and polymer seals that degrade in a tritium environment, creating debris, leaks, or electrical failures. Mechanical stresses on brazed joints between the plunger and the cutter tube can cause fatigue and separation, halting pellet cutting and operation of the injector. Furthermore, the propellant valve and its solenoid housing includes welds and dissimilar metal joints that are difficult to qualify under emerging tritium boundary standards, which require 100% volumetric inspection of primary boundary welds. Fillet welds and dissimilar joints, commonly used in prior designs, are not acceptable for such qualification.

Accordingly, there remains a continued need for an improved cryogenic pellet gas gun that provides tritium compatibility for D-T pellet injection. In particular, there remains a continued need for an improved pellet gas gun that can operate with tritium and meets tritium boundary standards for long pulse fusion power production and for other applications involving long-pulse, high density magnetically-confined plasmas for energy production.

SUMMARY OF THE INVENTION

A tritium-compatible pellet gas gun for a D-T pellet fueling apparatus is provided. In one aspect, the tritium-compatible pellet gas gun includes a pellet sizer assembly that provides in situ adjustment of pellet length during injector operation. The pellet sizer assembly includes a guillotine slide that is actuated by a pusher tube, the guillotine slide being operable to restrict the orifice of the extruder nozzle that feeds that gas gun to to provide adjustment of pellet length with fine resolution. The tritium-compatible pellet gas gun also includes dual flexible metal bellows seals that maintain hermetic separation between the D-T fuel region, a guard vacuum cryostat, and the ambient environment, while still permitting linear sizer motion. This configuration allows the pellet length to be reduced without venting or warming the system.

In another aspect, the tritium-compatible pellet gas gun includes a cutter assembly within a solenoid coil located outside of the D-T gas boundary of a pellet fueling apparatus. A stainless-steel solenoid housing functions as a magnetic insulator, while high-permeability steel components complete the magnetic circuit. A cutter plunger that is actuated by the solenoid is secured to a hollow actuator rod with a threaded and brazed connection, and return shock is absorbed by an all-metal bump stop with a wave spring, thereby eliminating tritium-incompatible polymer materials. The actuator rod is coupled to a cutter tube that is machined from stainless steel. The actuator rod is actuated by the plunger to drive the cutter tube forward. When driven forward, the cutter tube cuts a cylindrical pellet from the solid extrusion and chambers the cylindrical pellet into the gun barrel. The cutter tube is spring loaded to return the plunger against the stop when the solenoid electrical pulse actuation ends.

In a further aspect, the tritium-compatible pellet gas gun includes a propellant valve assembly having a valve body, optionally constructed of stainless steel. The gas inlet incorporates a machined stub that enables square-groove weld joints suitable for 100% volumetric nondestructive examination (NDE), consistent with emerging tritium boundary standards. The valve tip is actuated by a free-floating shuttle armature that uses momentum to aid opening, while reseating is achieved with a return spring and internal gas pressure. The valve tip is made of a polyimide that is compatible with exposure to tritium and is shaped to enable a vacuum leak tight seal.

As set forth herein, the foregoing features of the tritium-compatible pellet gas gun (i) allow real-time pellet size adjustment, (ii) eliminate tritium-incompatible materials, (iii) improve structural durability under cyclic loading, and (iv) incorporate weld and joint designs that can be qualified under tritium boundary standards. These features enable long-term, steady-state D-T fueling operations required for fusion reactors.

These and other features and advantages of the present invention will become apparent from the following description of the invention, when viewed in accordance with the accompanying drawings and appended claims.

DETAILED DESCRIPTION OF THE CURRENT EMBODIMENTS

The present embodiments include a tritium-compatible pellet gas gun for cutting and accelerating deuterium-tritium (D-T) fusion fuel pellets into a plasma as part of a pellet fueling apparatus. The pellet fueling apparatus is described in Part I below, and the pellet gas gun and its operation are described in Part II below.

I. Pellet Fueling Apparatus

Figure 1:
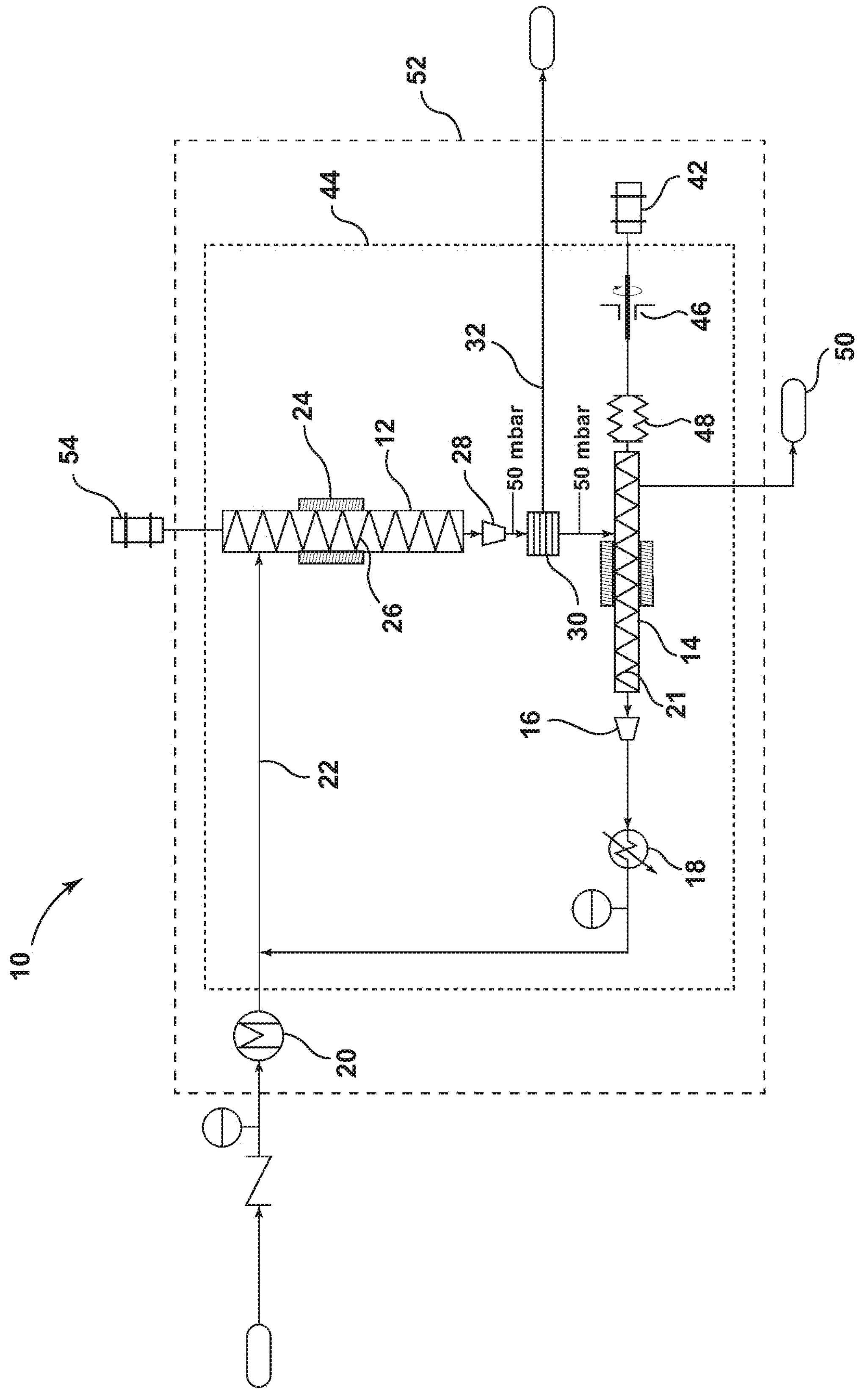
FIG. 1 illustrates a pellet fueling apparatus for the continuous production of D-T fuel pellets.

With reference to the embodiment shown in FIG. 1, a pellet fueling apparatus for the continuous production and acceleration of D-T fuel pellets is illustrated and generally designated 10. The fueling apparatus 10 includes a cryogenically-cooled extruder 12, a cryogenically-cooled auger 14, a restrictive section 16, a heater section 18, and a pre-cooler 20. The pre-cooler 20 reduces the temperature of a D-T fuel gas to about 30 K to 80 K, while maintaining the supply pressure at or near 1.5 bar. The extruder 12 is surrounded by a cryogenic heat exchanger 24 that maintains operating temperatures in the range of 10 K to 15 K. Within the cryogenically-cooled extruder 12, the D-T fuel gas desublimates or freezes onto the interior barrel surfaces and is scraped and compacted by a rotating screw 26. The screw 26 compresses the solidified fuel and discharges it through an extruder nozzle 28, producing a solid extrusion ribbon having a rectangular cross-section. A pellet gas gun 30 positioned below the nozzle 28 cuts the solid extrusion ribbon to form cylindrical pellets. The cylindrical pellets are delivered into a pellet gun barrel 32, which enables accelerating of the pellets with high pressure gas towards a plasma chamber at high speeds for fueling.

In some embodiments, excess solid extrusion flows into the cryogenically-cooled auger 14 by gravity. The cryogenically-cooled auger 14 conveys the excess solid extrusion toward the restriction section 16, where it consolidates into a solid fuel plug. The heater section 18 is positioned after the restriction section 16 and is configured to apply thermal energy to the leading portion of the solid fuel plug, converting the leading portion of the solid fuel plug into gaseous hydrogen. The gaseous hydrogen is coupled to a supply line 22, which introduces the gaseous hydrogen into the cryogenically-cooled extruder 12.

Of note, other embodiments omit the cryogenically-cooled auger 14, the restrictive section 16, the heater section 18, as these components relate to the recirculation of excess solid extrusion. For example, in other embodiments the excess solid extrusion is received by a dump chamber for recirculation to the extruder 12 via one or more cryopumps. In still other embodiments, the excess solid extrusion can be reprocessed in large-scale gas handling and processing systems that do not form part of the pellet fueling apparatus 10.

As also shown in FIG. 1, the auger 14 is driven by a motor 42 coupled magnetically across a heat shield 44 via a magnetic coupling and a rotary feedthrough 46. A displacement bellows 48 accommodates axial movement of the auger screw, and an extruder dump port 50 is provided for removal of accumulated material. A guard vacuum chamber 52 surrounds the heat shield 44 to maintain cryogenic efficiency. Lastly, an extruder motor 54 is positioned outside of the guard vacuum chamber 52 to deliver torque to the extruder screw.

II. Pellet Gas Gun

Figure 2:
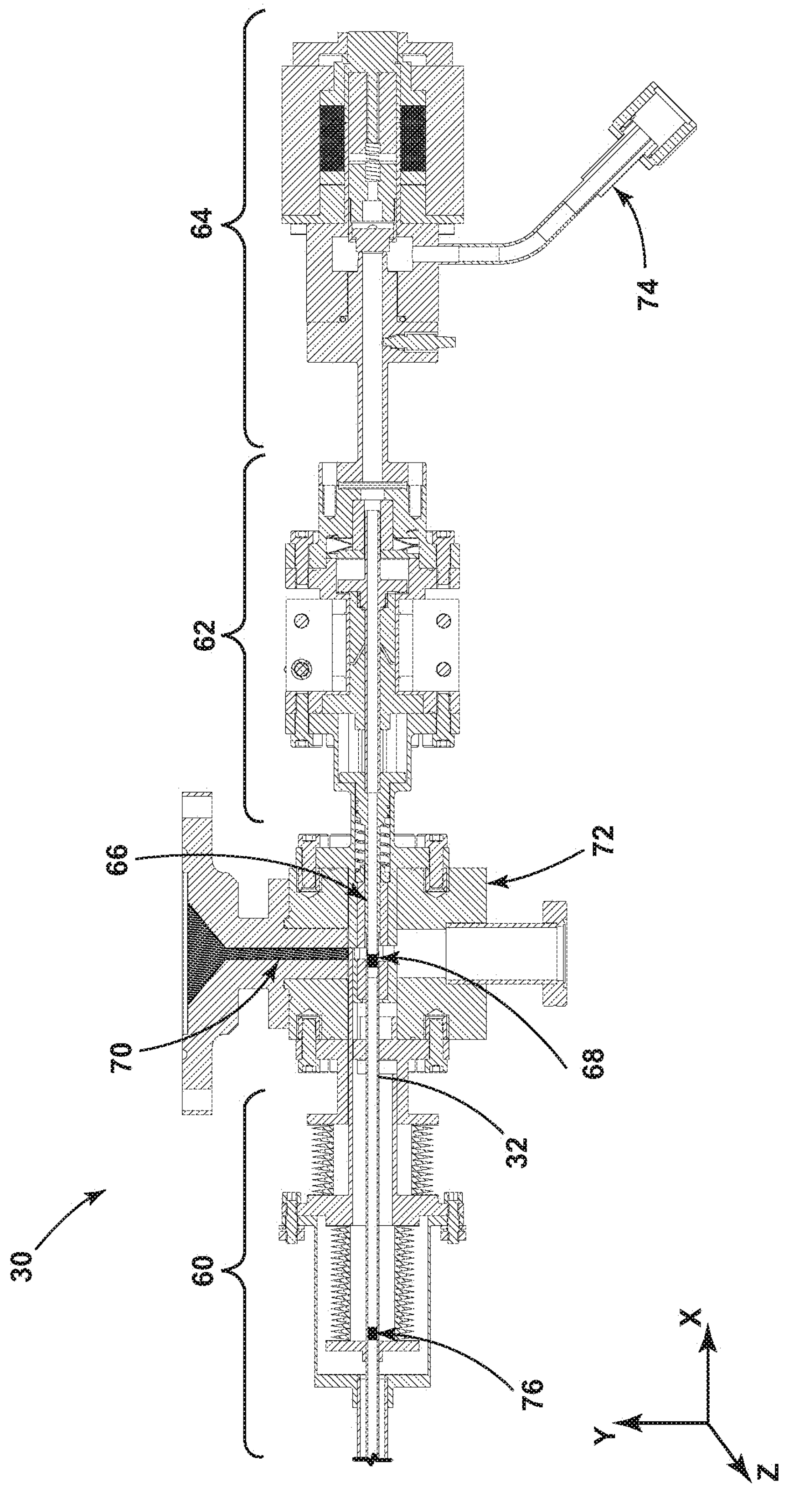
FIG. 2 is a cross-sectional view of a tritium-compatible pellet gas gun for the pellet fueling apparatus of FIG. 1.

As noted above, the pellet fueling apparatus 10 includes a tritium-compatible pellet gas gun 30 to cut the solid extrusion ribbon into cylindrical pellets that are accelerated into a plasma via a pellet gun barrel 32. The pellet gas gun 30 is illustrated in FIG. 2 and includes includes a pellet sizer assembly 60, a pellet cutter assembly 62, and a propellant valve assembly 64 connected to a high-pressure gas supply 74. The pellet sizer assembly 60 restricts the length of the solid extrusion prior to cutting. The pellet cutter assembly 62 includes a cutter tube 66 that cuts and chambers a pellet 68 from the solid extrusion 70. The chambered pellet 68 is received within the pellet gun barrel 32 in a gun block 72, after which high-pressure propellant gas is released from the propellant valve 64 and accelerates the chambered pellet 68 to the desired injection velocity (the fired pellet 76 also being shown in FIG. 2). Each such component of the pellet gas gun 30 is discussed below.

Figure 3:
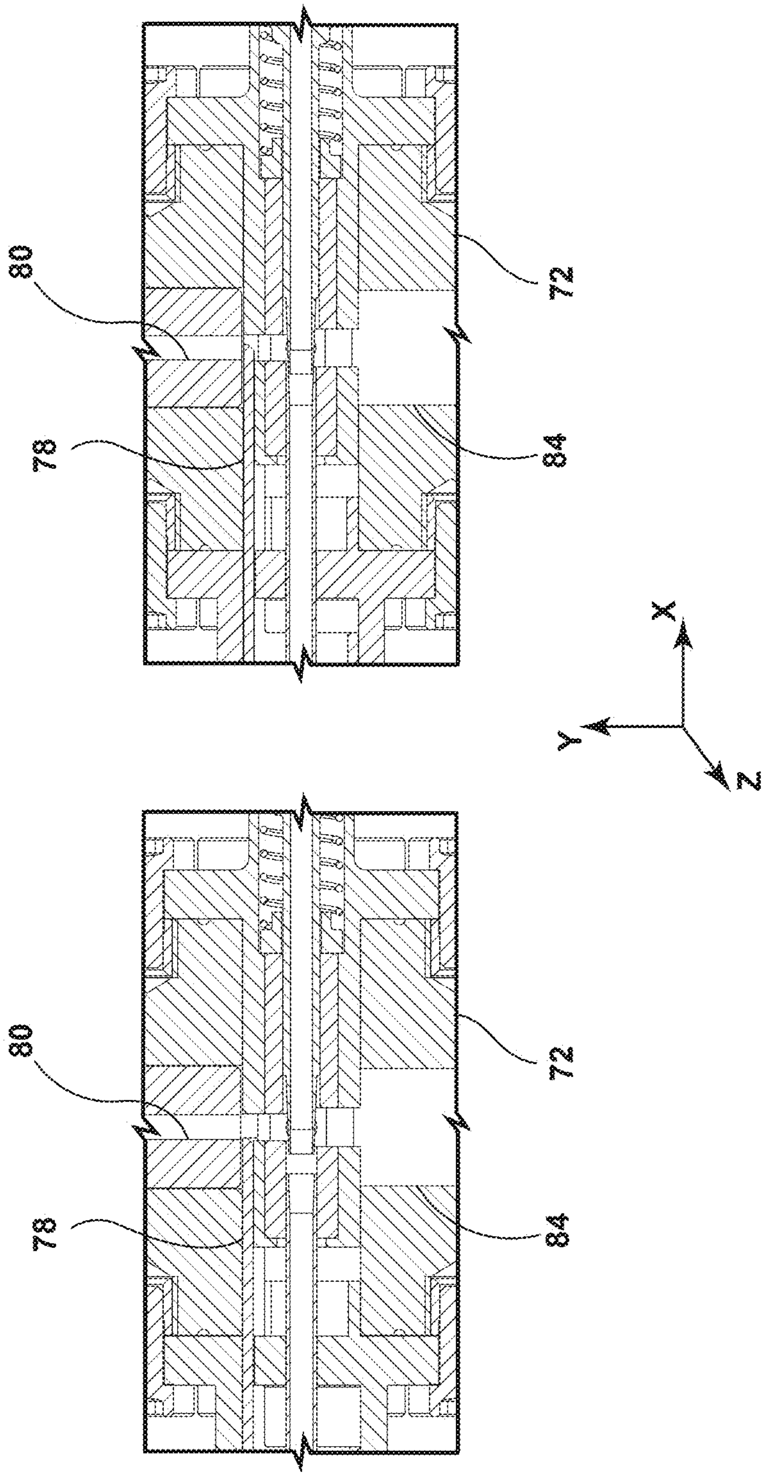
FIG. 3 are cross-sectional views of a pellet sizer assembly for the tritium-compatible gas gun of FIG. 2.
Figure 4:
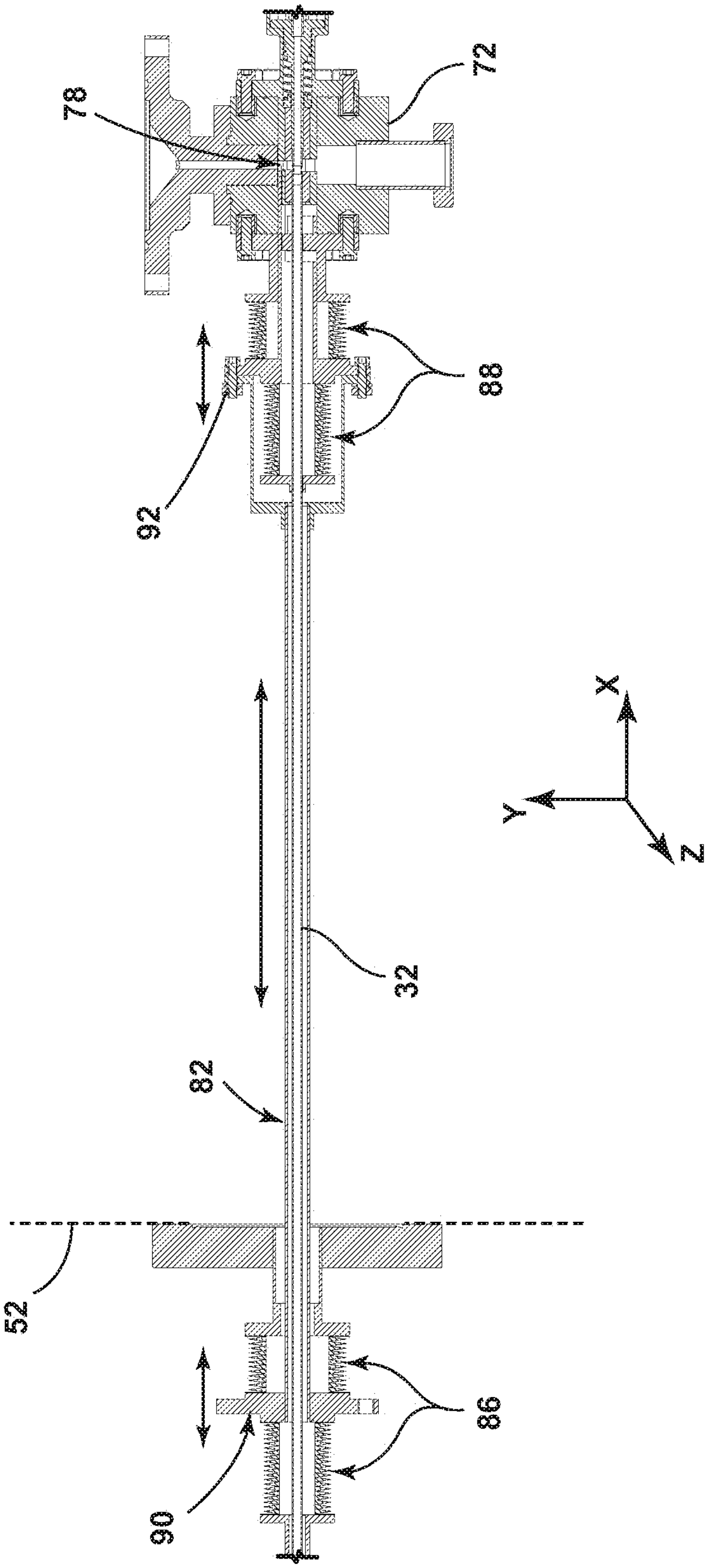
FIG. 4 is a cross-sectional view of the bellows seals and pushrod for the pellet sizer assembly of FIG. 3.

As shown in FIGS. 3-4, the pellet sizer assembly 60 includes a guillotine slide 78 that is actuated laterally to control the size of the solid extrusion being discharged from the extruder nozzle opening 80. In particular, the guillotine slide 78 is actuated by a linear actuator positioned outside of the guard vacuum chamber 52. The linear actuator is mechanically coupled to a pusher tube 82, which in turn is mechanically coupled to the guillotine slide 78. The guillotine slide 78 is generally rectangular in shape, having a lateral width (in the Z-direction) that is at least equal to the width of the nozzle opening 80 (also in the Z-direction). The guillotine slide 78 is moveable laterally, in the X-direction as shown in FIGS. 3-4, to reduce the width of the rectangular extrusion, with a resolution of approximately 0.1 mm provided by the linear actuator. When the guillotine slide 78 is fully retracted (as shown at left in FIG. 3), the leading edge of the guillotine slide 78 does not obstruct the nozzle opening 80. In this retracted position, the rectangular extrusion has a maximum width, which correlates to the length of each cylindrical pellet. When the guillotine slide 78 is extended, the guillotine slide 78 partially obstructs the nozzle opening 80 in the X-direction, reducing the length of each cylindrical pellet. Excess extrusion passes through a vertical discharge channel 84 and is optionally received by the auger 14 for recirculation into the extruder 12 as set forth above.

As best shown in FIG. 4, the pellet sizer assembly 60 includes two bellows seals 86, 88. A first bellows seal 86 separates the guard vacuum chamber 52 from the surrounding atmosphere. The first bellows seal 86 includes two series-connected bellows on either side of an external disc-shaped flange 90. The external disc-shaped flange 90 is coupled to the linear actuator and is rigidly connected to the actuator pusher tube 82. The second bellows seal 88 is located adjacent to the extruder nozzle and defines the boundary between the D-T fuel region and the guard vacuum. The second bellows seal 88 includes two series-connected bellows on either side of an internal disc-shaped flange 92 that is rigidly coupled to the guillotine slide 78. In operation, the linear actuator causes the external disc-shaped flange 90 to move laterally, which in turn causes the pusher tube 82 to move laterally. The pusher tube 82 is rigidly coupled to the internal disc-shaped flange 92, which in turn is rigidly coupled to the guillotine slide 78.

Referring now to FIGS. 5-8, the pellet gas gun 30 also includes a cutter assembly 62. The cutter assembly 62 is configured to sever the solid extrusion into uniform, cylindrical pellets while operating at cryogenic temperatures. The cutter assembly 62 comprises the aforementioned cutter tube 66, a solenoid housing 94, a solenoid coil 96, a plunger 98, a hollow actuator rod 100, and a return spring assembly 102. The solenoid housing 94 includes a central bore 104 to accommodate linear movement of the plunger 98 therein. The solenoid coil 96 extends around the solenoid housing 94 outside of the tritium boundary and is electrically connected to a pulsed power supply for magnetically actuating the plunger 98, which is formed of a ferromagnetic material. A solenoid clamshell 106 surrounds the solenoid coil 96, the solenoid housing 94 and the solenoid clamshell 106 being formed from stainless steel.

Figure 5:
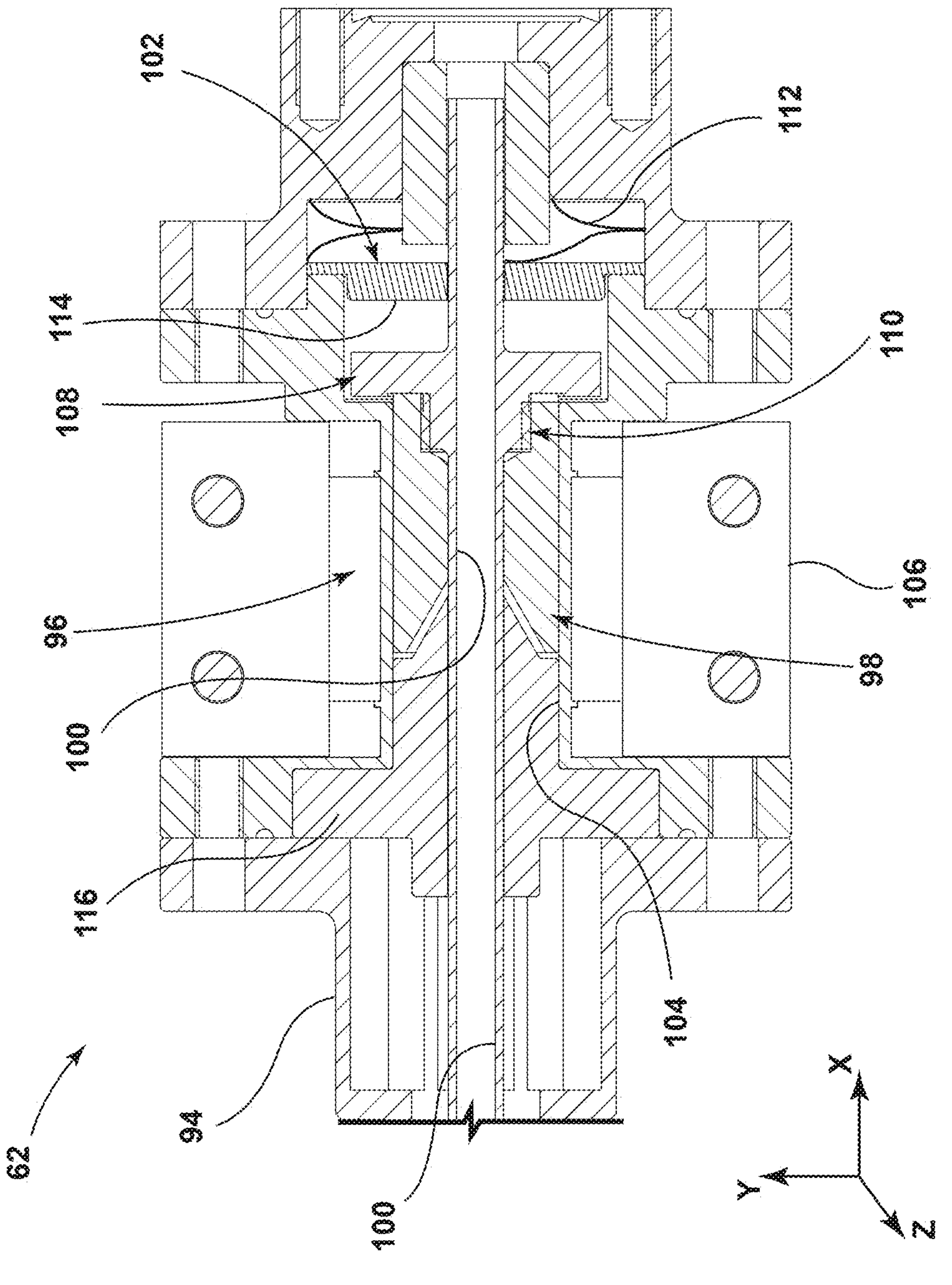
FIG. 5 is a cross-sectional view of a pellet cutter assembly for the tritium-compatible gas gun of FIG. 2.
Figure 6:
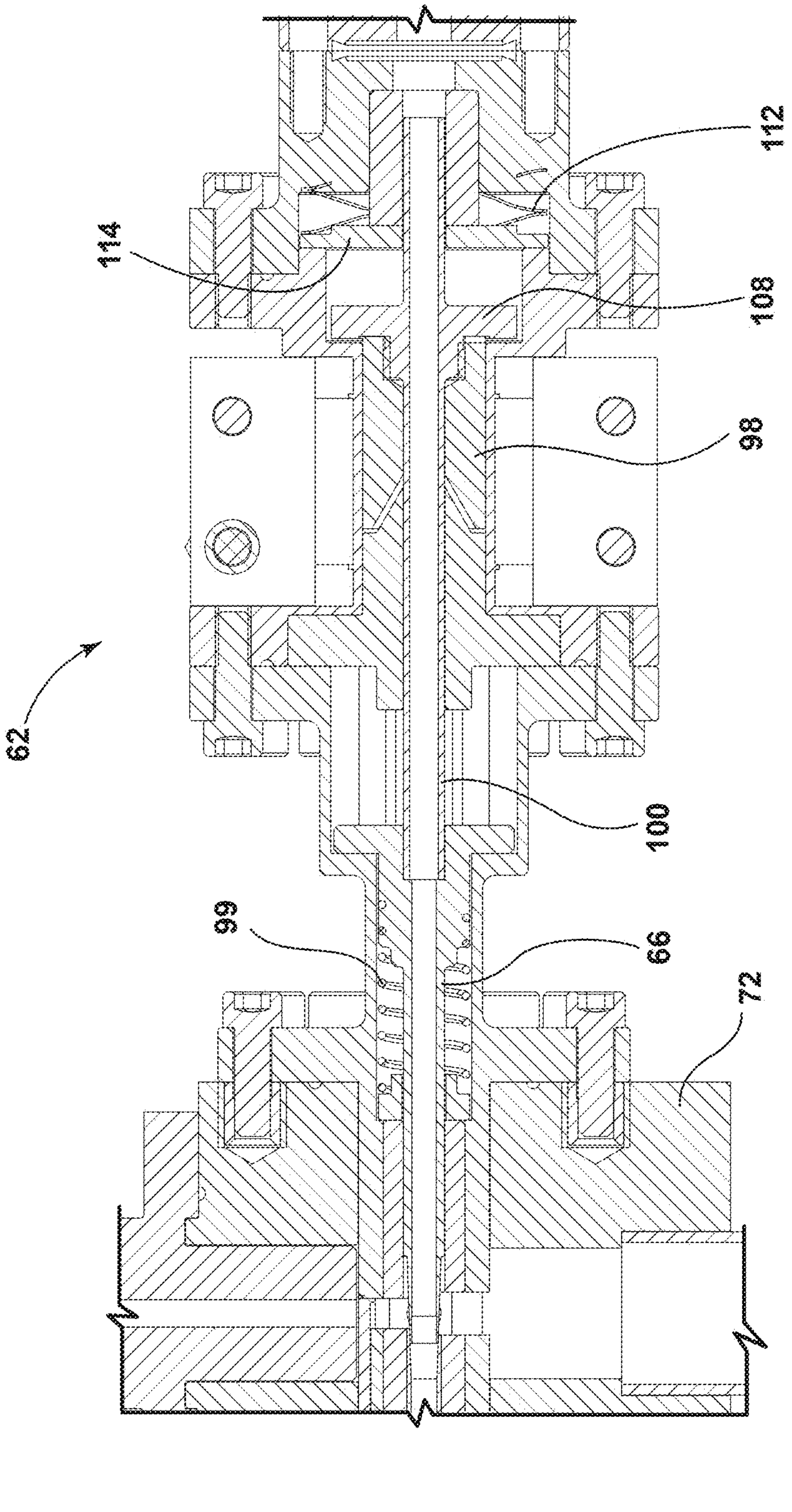
FIG. 6 is a cross-sectional view of the pellet cutter assembly illustrating the cutter tube in the fully engaged position.

As also shown in FIG. 5, the plunger 98 is joined to a bump stop flange 108 via a threaded and brazed connection 110. The bump stop flange 108 is integrally coupled to the actuator rod 100, each being formed from stainless steel. As best shown in FIG. 6, the actuator rod 100 extends through an axial through-bore in the plunger 98 and engages a rear portion of the cutter tube 66, the cutter tube 66 being hollow and having an inner diameter corresponding the desired outer diameter of each cylindrical pellet. The actuator rod 100 includes a through-bore to allow high-pressure gas to flow to the chambered pellet. The return spring assembly 102 limits rearward travel of the bump stop flange 108. More particularly, the return spring assembly 102 includes a metal wave spring 112 and a metal washer 114 contained within an axial end portion of the solenoid housing 94. Forward travel of the actuator rod 100 is limited by a plunger edge flange 116. The plunger end flange 116 is fixed within the solenoid housing 94 and includes a sloped surface which engages a sloped surface of the plunger 98.

Figure 7:
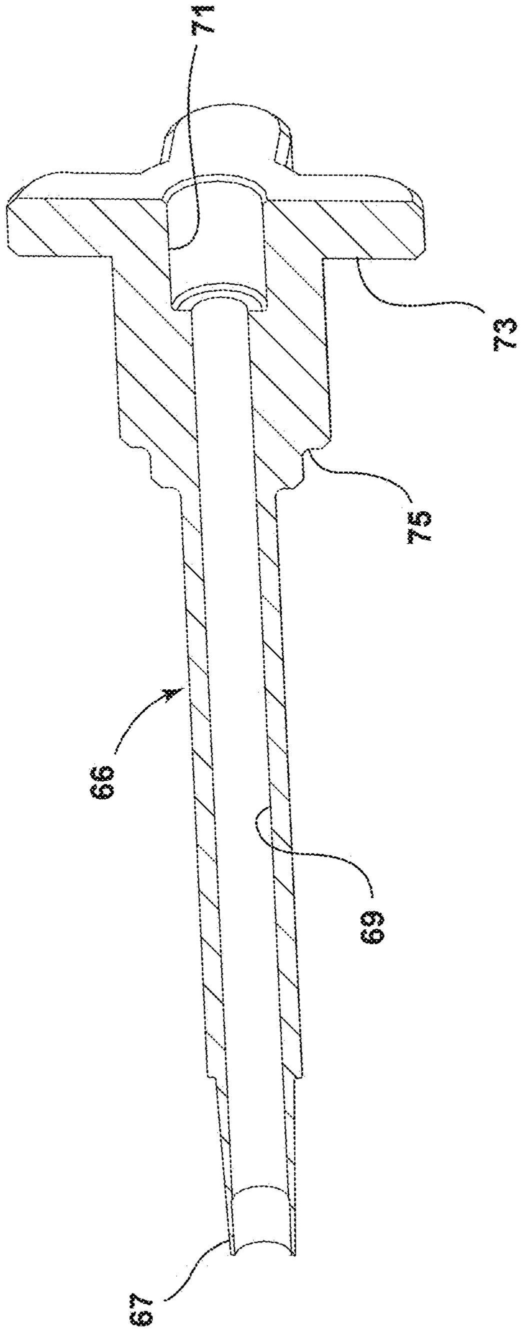
FIG. 7 is a cross-sectional view of the cutter tube from FIG. 7 for cutting cylindrical fuel pellets from a cryogenic extrusion.
Figure 8:
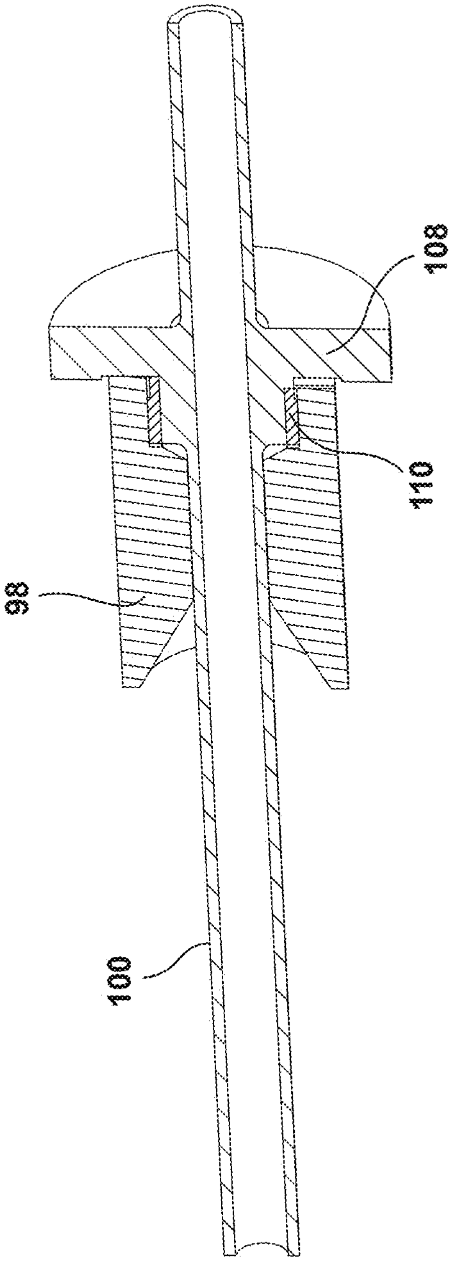
FIG. 8 is a cross-sectional view of the plunger and actuator rod from FIG. 7, which are joined to each other via a threaded and brazed connection.

The cutter tube 66 and the actuator rod 100 are also shown in FIGS. 7-8. The cutter tube 66 includes a tip 67 having a tapered outer diameter for cutting a cylindrical pellet from the rectangular extrusion. The cutter tube 66 also includes a through-bore 69 to allow high-pressure gas to accelerate the cylindrical pellet through the pellet gun tube. The actuator rod 100 is received within an opening 71 in the cutter tube 66, and an annular flange 73 limits forward travel of the cutter tube 66. Lastly, the cutter tube 66 includes an annular spring seat 75 for a return spring 99 (visible in FIG. 6), which biases the cutter tube 66 rearwardly.

In operation, energization of the solenoid coil 96 generates a magnetic flux through the solenoid housing 94 and into the ferromagnetic plunger 98. This electromagnetic flux draws the plunger 98 and the actuator rod 100 forward (fully engaged as shown in FIG. 6) to cut a pellet from the solid extrusion and to chamber the pellet in the pellet gun barrel. Upon coil de-energization, a return spring 99 forces the cutter tube 66 rearward to retract the cutter tube 66 from the solid extrusion. The wave spring assembly 102 absorbs any return shock from the actuator rod 100, and an optional shock accelerometer can be mounted to the solenoid housing 94 to monitor chambering and cutting dynamics.

Figure 9:
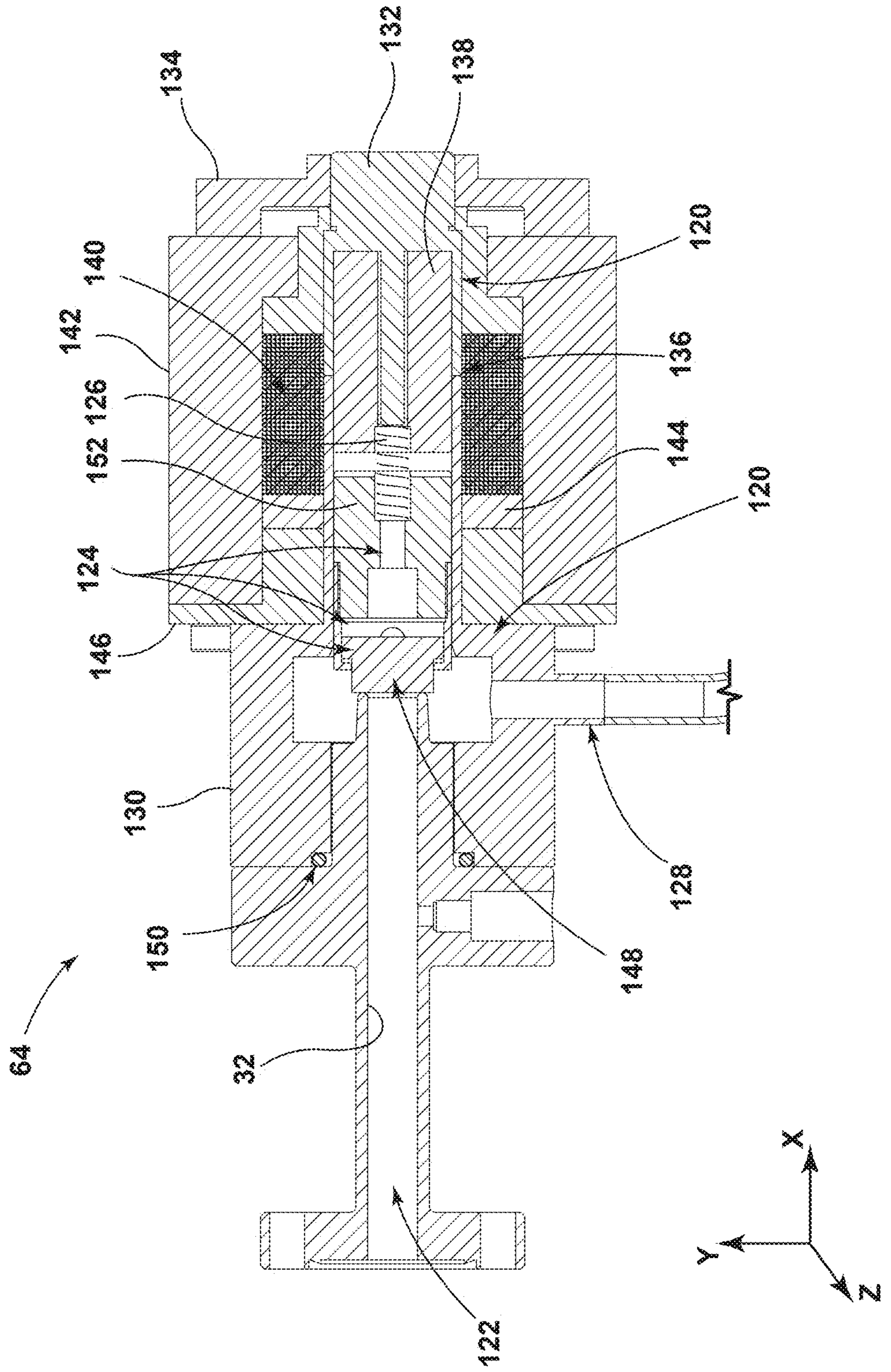
FIG. 9 is a cross-sectional view of the propellant valve assembly for the tritium-compatible gas gun of FIG. 2.

Referring now to FIG. 9, the propellant valve assembly 64 is illustrated. The propellant valve assembly 64 is operated to accelerate individual fuel pellets into a plasma as part of a D-T pellet fueling apparatus. The propellant valve assembly 64 includes a valve body 120, a valve seat 122, a shuttle assembly 124, and a return spring 126. Each such component of the propellant valve assembly 64 is discussed below.

The valve body 120 includes a central bore to accommodate linear movement of the shuttle assembly 124 therein. The valve body 120 also includes an integral gas supply stub 128 that enables a square-groove weld joint, facilitating 100% volumetric nondestructive examination (NDE) of the tritium boundary welds. A first end 130 of the valve body 120 is joined to the valve seat 122, which defines a portion of the gun barrel 32. A second end 132 of the valve body 120 is joined to a coil shield nut 134, which is also formed from stainless steel. The first end 130 of the valve body 120 is joined to the second end 132 of the valve body 120 by a square groove weld 136. The coil shield nut 134 axially clamps a valve body insert 138 within the valve body 120, providing a travel limit for the shuttle armature assembly 124.

As also shown in FIG. 9, a solenoid coil 140 extends around the valve body 120 and is electrically connected to a power source for magnetically actuating the shuttle armature assembly 124. A coil shield 142 is formed from stainless steel and surrounds the solenoid coil 140 and a metal spacer 144. The coil shield 142 is clamped between the coil shield nut 134 and a coil base flange 146. A valve tip 148 made from tritium-compatible polyimide Vespel® seats against the stainless-steel valve seat 122 and is sealed by a metal Helicoflex® o-ring seal 150. The shuttle armature assembly 124 includes an armature 152 that is not rigidly attached to the valve tip 148, but instead is free-floating to allow a short travel distance prior to engaging the valve tip 148.

When the solenoid coil 140 is energized, magnetic flux through the valve body 120 draws the armature 152 toward the solenoid coil 140, lifting the valve tip 148 from the valve seat 122 and releasing a burst of high-pressure propellant gas to accelerate a chambered pellet through the pellet barrel 32. Upon de-energization, the return spring 126 re-seats the valve tip 148, and internal gas pressure maintains seal tightness. The solenoid coil 140 is external to the D-T boundary, preventing exposure to tritium and associated degradation.

In use, frozen hydrogen isotope extrusion from the cryogenic extruder 12 enters the gun block 72, where the guillotine slide 78 is positioned to set pellet length. The cutter assembly 62 is then actuated to sever and chamber the pellet in the gun block. Finally, the propellant valve assembly 164 releases a pulse of high-pressure gas behind the chambered pellet, propelling the pellet down the barrel 32. This integrated design allows continuous operation with adjustable pellet sizing, tritium-compatible materials and seals, durable all-metal shock absorption, and weld configurations suitable for NDE qualification.

As set forth above, the tritium-compatible pellet gas gun is uniquely adapted to allow real-time pellet size adjustment while eliminating tritium-incompatible materials, improving structural durability under cyclic loading, and incorporating weld and joint designs that can be qualified under tritium boundary standards. These features enable long-term, steady-state D-T fueling operations required for fusion reactors and for other applications, whether now known or hereinafter developed.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A tritium-compatible gas gun for producing cryogenic fusion fuel pellets from a solid extrusion ribbon as the solid extrusion ribbon is discharged from an extruder through an extruder nozzle opening, the gas gun comprising:

a pellet sizer assembly including an adjustable guillotine slide that is configured to restrict the extruder nozzle opening, the guillotine slide being an elongated rectangular member, the pellet sizer assembly further including a first flexible metal bellows seal and a second flexible metal bellows seal;

wherein the first flexible metal bellows seal includes series-connected bellows on either side of a first flange, the second flexible metal bellows seal includes series-connected bellows on either side of a second flange, the first flange being coupled to the second flange via a pusher tube, and the second flange being rigidly coupled to the guillotine slide, such that lateral movement of the first flange causes lateral movement of the second flange via the pusher tube, thereby causing lateral movement of the guillotine slide to at least partially restrict the extruder nozzle opening;

a cutter assembly including a cutter solenoid housing, a cutter tube, a plunger operatively coupled to a first solenoid coil, and a spring assembly to absorb return shock from the plunger;

a gun barrel concentrically disposed within the pusher tube and configured to receive pellets that have been cut from the solid extrusion ribbon by the cutter tube; and a propellant valve assembly including a valve body, a second solenoid coil, a shuttle armature that is operatively coupled to a valve tip such that energization of the second solenoid coil causes the valve tip to unseat from a valve seat, and a return spring configured to reseat the valve tip and maintain seal tightness when the second solenoid coil is deenergized.

2. The gas gun of claim 1, wherein the pusher tube extends outside of a guard vacuum chamber for positioning the guillotine slide.

3. The gas gun of claim 1, wherein the adjustable guillotine slide of the pellet sizer assembly is configured to reduce fuel pellet length by up to 50%.

4. The gas gun of claim 1, wherein the first flexible metal bellows seal is positioned to separate a guard vacuum from an ambient environment.

5. The gas gun of claim 4, wherein the second flexible metal bellows seal is positioned adjacent the extruder to separate the guard vacuum from a deuterium-tritium (D-T) fuel environment.

6. The gas gun of claim 1, wherein the spring assembly includes a metal wave spring and metal washer, the metal wave spring being positioned to absorb return shock from the plunger.

7. The gas gun of claim 1, wherein the shuttle armature of the propellant valve assembly is free-floating relative to the valve tip.

8. The gas gun of claim 1, wherein the valve body of the propellant valve assembly consists entirely of stainless steel.

9. The gas gun of claim 1, wherein the valve body of the propellant valve assembly includes a first end portion joined to a second end portion by a square groove weld.

10. A method of producing and injecting cryogenic fusion fuel pellets with a tritium-compatible gas gun, the method comprising:

sizing a pellet by actuating an adjustable guillotine slide to restrict an orifice of an extruder nozzle, the guillotine slide being sealed by a first metal bellows seal and a second metal bellows seal, wherein the guillotine slide is an elongated rectangular member, and wherein each of the first metal bellows seal and the second metal bellows seal includes series-connected bellows on either side of a flange, the flange of the first metal bellow seal being coupled to the flange of the second metal bellows seal by a pusher tube that surrounds a gun barrel, such that lateral movement of the first metal bellows seal causes lateral movement of the second metal bellows seal via the pusher tube, thereby causing lateral movement of the guillotine slide;

cutting the pellet from a solid extrusion by plunging a cutter tube into the solid extrusion and absorbing a return shock of the cutter tube with a metal spring assembly; and propelling the pellet through the gun barrel, the gun barrel being concentrically disposed within the pusher tube, by energizing a solenoid coil to draw a shuttle armature toward a valve body to lift a valve tip from a valve seat, and thereafter reseating the valve tip with a return spring when the solenoid coil is deenergized to maintain seal tightness.

11. The method of claim 10, wherein the first metal bellows seal separates a guard vacuum from an ambient environment.

12. The method of claim 11, wherein the second flexible metal bellows seal separates the guard vacuum from a deuterium-tritium (D-T) fuel environment.

13. The method of claim 10, wherein the guillotine slide is actuated to reduce pellet length by up to 50%.

14. The method of claim 10, wherein absorbing the return shock comprises compressing a metal wave spring disposed in the cutter assembly.

15. The method of claim 10, wherein the shuttle armature of the propellant valve assembly is maintained free-floating relative to a valve tip.

16. The method of claim 10, wherein the valve body of the propellant valve assembly is formed entirely of stainless steel.

17. The method of claim 10, further comprising monitoring cutter operation by measuring shock loads with a shock accelerometer coupled to the cutter assembly.

* * * * *